US011479483B2

(12) United States Patent
Woo et al.

(10) Patent No.: US 11,479,483 B2
(45) Date of Patent: Oct. 25, 2022

(54) FILTER FOR WATER PURIFIER AND WATER PURIFIER INCLUDING THE SAME

(71) Applicant: LG Electronics Inc., Seoul (KR)

(72) Inventors: Suhye Woo, Seoul (KR); Sangduck Lee, Seoul (KR); Yuseung Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 190 days.

(21) Appl. No.: 16/869,854

(22) Filed: May 8, 2020

(65) Prior Publication Data

US 2021/0009442 A1 Jan. 14, 2021

(30) Foreign Application Priority Data

Jul. 8, 2019 (KR) .......................... 10-2019-0082293

(51) Int. Cl.
*C02F 1/28* (2006.01)
*C02F 1/70* (2006.01)
*B01D 15/10* (2006.01)
*C02F 1/00* (2006.01)
C02F 101/20 (2006.01)
(Continued)

(52) U.S. Cl.
CPC .............. *C02F 1/288* (2013.01); *B01D 15/10* (2013.01); *C02F 1/003* (2013.01); *C02F 1/281* (2013.01); *C02F 1/283* (2013.01); *C02F 1/705* (2013.01); *B01D 2253/102* (2013.01); *B01D 2253/1124* (2013.01); *B01D 2253/25* (2013.01); *B01D 2253/304* (2013.01); *C02F 2101/103* (2013.01); *C02F 2101/106* (2013.01);
(Continued)

(58) Field of Classification Search
None
See application file for complete search history.

(56) References Cited

U.S. PATENT DOCUMENTS 4,155,819 A * 5/1979 Carlin ...................... C01D 3/16
                                                      205/527
5,767,060 A * 6/1998 Hanrahan ............... B01J 20/20
                                                      210/502.1
(Continued)

FOREIGN PATENT DOCUMENTS

DE        10129307        12/2002
JP        2015504776       2/2015
(Continued)

OTHER PUBLICATIONS

IN Office Action in Indian Appln. No. 202014028706, dated Mar. 11, 2021, 5 pages.

*Primary Examiner* — Chester T Barry
(74) *Attorney, Agent, or Firm* — Fish & Richardson P.C.

(57) ABSTRACT

A filter for a water purifier includes a filter housing that defines an inlet and an outlet, and a filter module disposed inside the filter housing and configured to purify water received through the inlet and supply purified water to the outlet. The filter module includes a carbon block that includes a mixture of: activated carbon having a weight corresponding to 40 to 50% of a weight of the mixture, a binder having a weight corresponding to 5 to 15% of the weight of the mixture, iron hydroxide having a weight corresponding to 10 to 20% of the weight of the mixture, and titanium oxide having a weight corresponding to 30 to 40% of the weight of the mixture.

20 Claims, 11 Drawing Sheets

(51) Int. Cl.
*C02F 101/22* (2006.01)
*C02F 101/10* (2006.01)

(52) U.S. Cl.
CPC .. *C02F 2101/203* (2013.01); *C02F 2101/206* (2013.01); *C02F 2101/22* (2013.01); *C02F 2305/023* (2013.01)

(56) References Cited

U.S. PATENT DOCUMENTS

| | | | | |
|---|---|---|---|---|
| 6,793,866 | B2* | 9/2004 | Kelly | B01J 20/20 210/506 |
| 7,293,661 | B2* | 11/2007 | Saaski | B01J 20/20 210/483 |
| 8,058,201 | B2* | 11/2011 | Martinez | C08K 3/346 502/150 |
| 2003/0034290 | A1* | 2/2003 | Tochikubo | B01D 39/2055 210/243 |
| 2005/0133459 | A1* | 6/2005 | Schulz | C02F 9/005 210/198.1 |
| 2006/0186052 | A1* | 8/2006 | Seidel | B01J 45/00 210/688 |
| 2008/0110820 | A1* | 5/2008 | Knipmeyer | C02F 1/003 210/474 |
| 2008/0274043 | A1* | 11/2008 | Schlegel | B01J 20/06 423/632 |
| 2012/0228212 | A1* | 9/2012 | Jian | B01J 20/3007 210/483 |
| 2014/0374327 | A1 | 12/2014 | Langdo et al. | |
| 2016/0023144 | A1* | 1/2016 | Fitzgerald | C02F 1/004 422/261 |
| 2016/0090313 | A1* | 3/2016 | Shaffer | C02F 1/283 210/668 |
| 2016/0288024 | A1* | 10/2016 | Tsai | C02F 1/283 |
| 2016/0347633 | A1* | 12/2016 | Lee | C02F 1/705 |
| 2017/0233274 | A1* | 8/2017 | Kailasam | C02F 1/281 210/616 |
| 2018/0339251 | A1* | 11/2018 | Li | B01D 39/1623 |
| 2019/0152806 | A1* | 5/2019 | Wang | C02F 1/283 |
| 2019/0389740 | A1* | 12/2019 | Choi | B01D 39/2027 |
| 2020/0123372 | A1* | 4/2020 | Takeshita | B32B 27/302 |
| 2021/0114949 | A1* | 4/2021 | Sawant | C05D 9/02 |

FOREIGN PATENT DOCUMENTS

| | | | |
|---|---|---|---|
| KR | 20180064841 | | 6/2018 |
| KR | 20180064841 A | * | 6/2018 ......... B01D 39/2062 |

* cited by examiner

FIG. 7

| DIVISION | DETAILS | PRIOR ART | PRESENT DISCLOSURE |
|---|---|---|---|
| PRE CARBON BLOCK FILTER | OUTER DIAMETER | 41.5 mm | 43.5 mm |
| | INNER DIAMETER | 21.5 mm | 12.5 mm |
| | LENGTH | 149.5 mm | 149.5 mm |
| | ACTIVATED CARBON | 43 wt% | 40 ~ 50 wt% |
| | BINDER | 33 wt% | 5 ~ 15 wt% |
| | HEAVY METAL MATERIAL | IRON HYDROXIDE 24 wt% | IRON HYDROXIDE 10 ~ 20 wt% TITANIUM OXIDE 30 ~ 40 wt% |
| | NON-WOVEN FABRIC | 1 LAYER OF NON-WOVEN FABRIC | 1 LAYER OF NON-WOVEN FABRIC |

FIG. 8

|  | SUM | ACTIVATED CARBON | BINDER | HEAVY METAL REMOVAL MATERIAL | |
|---|---|---|---|---|---|
|  |  |  |  | IRON HYDROXIDE | TITANIUM DIOXIDE |
| WEIGHT(g) | 125 | 54 | 13 | 18 | 40 |
| WEIGHT RATIO OF MATERIAL(%) | 100 | 43.2 | 10.4 | 14.4 | 32 |
| RATIO OF MATERIAL RELATIVE TO ACTIVATED CARBON |  | 1 | 0.2 | 0.3 | 0.7 |

FIG. 9

| RATIO OF MATERIAL RELATIVE TO ACTIVATED CARBON(%) | | | | | HEAVY METAL REMOVAL TEST RESULTS(%) | | |
|---|---|---|---|---|---|---|---|
| SUM | ACTIVATED CARBON | BINDER | HEAVY METAL REMOVAL MATERIAL | | ARSENIC | MANGANESE | ZINC |
| | | | IRON HYDROXIDE | TITANIUM DIOXIDE | 90%↑ | 80%↑ | 70%↑ |
| 1:1 | 1.0 | 0.2 | 0.3 | 0.7 | 100 | 100 | 72 |
| 1:4.5 | 1.0 | 1.1 | 1.5 | 3 | 76 | 15 | 68 |

FIG. 10

| TYPE | ACTIVATED CARBON | BINDER | IRON HYDROXIDE | TITANIUM DIOXIDE |
|---|---|---|---|---|
| Range | 100 ~ 140 μm | 30 μm | 60 ~ 120 μm | 30 ~ 80 μm |
| Avg. | 120 μm | 30 μm | 90 μm | 50 μm |

FILTER FOR WATER PURIFIER AND WATER PURIFIER INCLUDING THE SAME

CROSS-REFERENCE TO RELATED APPLICATION

This application claims a benefit under 35 U.S.C. § 119(a) of Korean Patent Application No. 10-2019-0082293, filed on Jul. 8, 2019, in the Korean Intellectual Property Office, the entire disclosure of which is incorporated herein by reference for all purposes.

TECHNICAL FIELD

The present specification relates to a filter for a water purifier and a water purifier including the same in which a mixed amount of a binder is reduced.

BACKGROUND

The water purifier may purify raw water such as tap water or groundwater. For example, the water purifier may be an apparatus for converting raw water into drinking water through various water purification schemes and providing the drinking water.

In order to produce purified water, the raw water may be processed through precipitation, filtration, sterilization, and the like. Through these processes, harmful substances may be removed.

In some cases, the water purifier may be equipped with various filters to purify the raw water. These filters may be classified into a sediment filter, an activated carbon filter, an ultrafiltration (UF) hollow fiber membrane filter, a reverse osmosis (RO) membrane filter, and the like.

The sediment filter may precipitate contaminants or floating matters with large particles in the raw water. The activated carbon filter may adsorb and remove contaminants, residual chlorine, volatile organic compounds, or odor-causing factors with small particles.

In some examples, the activated carbon filter may include two activated carbon filters. For instance, the activated carbon filter may include a pre carbon filter provided on a raw water side and a post carbon filter provided on a purified water side. The post carbon filter may be provided to improve taste of water by removing the odor-causing substances that mainly affect the taste of the purified water.

In some cases, both the UF hollow fiber membrane filter and the RO membrane filter may be used selectively.

Recently, a demand for the water purifier has increased significantly. Therefore, various requirements are generated and it may be difficult to satisfy the various requirements at the same time.

For example, a heavy metal may be removed by applying the RO membrane filter, but it may be difficult to secure a flow rate of the purified water. In some cases, it may take a long time to obtain an amount of purified water as desired.

In some cases, where the UF hollow fiber membrane filter is used, although a high flow rate may be secured, it may be difficult to use groundwater or tap water in a contaminated region as the raw water since it may be difficult to remove the heavy metal in the water.

In some cases, the heavy metal removal and the high flow rate securement may be desired. Because it is difficult to secure the high flow rate when using the RO membrane filter to remove the heavy metal and it is difficult to remove the heavy metal when using the UF hollow fiber membrane filter to secure the high flow rate.

In some examples, heavy metal removal filters may remove seven kinds of heavy metals in water including arsenic (As), Cadmium (Cd), lead (Pb), aluminum (Al), mercury (Hg), iron (Fe), and copper (Cu).

In recent years, there has been a need to remove eleven or more kinds of heavy metals including not only the above seven kinds but also selenium (Se), chromium (Cr), manganese (Mn), and zinc (Zn).

In some cases, the water purifier filter may be insufficient to completely remove the seven kinds of heavy metals while ensuring the high flow rate. Further, the selenium (Se), chromium (Cr), manganese (Mn), zinc (Zn), and the like in the water may be not removed at all by the water purifier filter.

In some cases, a particle size of a binder mixed in the filter may be large so that flow resistance can be generated. A mixed amount of the binder may occupy a large proportion so that a water permeability can be lowered. In these cases, an effective purified water amount may be lowered.

In some cases, a mixing ratio of activated carbon and a heavy metal removing material mixed in the filter may be not sufficient to remove the heavy metal.

SUMMARY

The present disclosure describes a filter for a water purifier and a water purifier including the same that may lower a mixing ratio of a binder by applying a binder having a small particle size than a binder in related art.

The present disclosure describes a filter for a water purifier and a water purifier including the same in which a particle size of a binder becomes small and binder content is reduced, so that the binder may be uniformly dispersed, thereby increasing a specific surface area of a heavy metal removal material to improve a heavy metal removal performance.

The present disclosure describes a filter for a water purifier and a water purifier including the same in which a particle size of a binder becomes small and binder content is reduced, so that the binder may be uniformly dispersed, thereby increasing a purified water flow rate and increasing an effective purified water amount.

The present disclosure describes a filter for a water purifier and a water purifier including the same that may effectively remove heavy metals in water, including selenium (Se), chromium (Cr), manganese (Mn), and zinc (Zn) in water.

The present disclosure describes a filter for a water purifier and a water purifier including the same that may remove heavy metals such as lead, mercury, arsenic, iron, aluminum, copper, cadmium, and the like in water while securing a treatment capacity.

The present disclosure describes a filter for a water purifier and a water purifier including the same that may remove at least nine kinds of heavy metals.

The present disclosure describes a filter for a water purifier that may be applied directly to an existing water purifier without changing a shape or arrangement of a filter applied to the water purifier, and a water purifier including the same.

The present disclosure describes a filter for a water purifier and a water purifier including the same that may increase space utilization by reducing a volume of a filter by disposing a heterogeneous filter longitudinally in a single filter housing.

According to one aspect of the subject matter described in this application, a filter for a water purifier includes a filter housing that defines an inlet and an outlet, and a filter module disposed inside the filter housing and configured to purify water received through the inlet and supply purified water to the outlet. The filter module includes a carbon block that includes a mixture of: activated carbon having a weight corresponding to 40 to 50% of a weight of the mixture, a binder having a weight corresponding to 5 to 15% of the weight of the mixture, iron hydroxide having a weight corresponding to 10 to 20% of the weight of the mixture, and titanium oxide having a weight corresponding to 30 to 40% of the weight of the mixture.

Implementations according to this aspect may include one or more of the following features. For example, the binder may include polyethylene (PE). In some examples, the carbon block may have a hollow tube shape. In some implementations, the filter may include a non-woven fabric that is made of a resin and that covers an outer surface of the carbon block.

In some examples, a ratio of an inner diameter of the carbon block to an outer diameter of the carbon block may be 1:3 to 1:4. In some examples, the titanium oxide may include titanium dioxide.

In some implementations, a water purifier may include at least one water purifier filter configured to produce purified water from raw water, and the at least one water purifier filter may include the filter described above.

According to another aspect, a filter for a water purifier may include a filter housing that defines an inlet and an outlet, and a filter module disposed inside the filter housing and configured to purify water received through the inlet and supply purified water to the outlet. The filter module may include a carbon block including a mixture of activated carbon, a binder, iron hydroxide, and titanium oxide. The binder includes polyethylene (PE).

Implementations according to this aspect may include one or more of the following features. For example, an average particle size of the iron hydroxide may be less than an average particle size of the activated carbon, an average particle size of the titanium oxide may be less than the average particle size of the iron hydroxide, and an average particle size of the binder may be less than the average particle size of the titanium oxide.

For example, the average particle size of the activated carbon may be less than or equal to 120 μm; the average particle size of the iron hydroxide may be less than or equal to 90 μm; and the average particle size of the titanium oxide may be less than or equal to 50 μm.

In some implementations, a water purifier may include at least one water purifier filter configured to produce purified water from raw water, and the at least one water purifier filter may include the filter described above.

According to another aspect, a filter for a water purifier includes a filter housing that defines an inlet and an outlet, and a filter module disposed inside the filter housing and configured to purify water received through the inlet and supply purified water to the outlet. The filter module includes a carbon block that includes a mixture of activated carbon, a binder, iron hydroxide, and titanium oxide, where a combined weight of the iron hydroxide and the titanium oxide in the mixture is 100 to 110% of a weight of the activated carbon in the mixture. In some implementations according to this aspect, a water purifier may include at least one water purifier filter configured to produce purified water from raw water, and the at least one water purifier filter may include the filter described above.

According to another aspect, a filter for a water purifier includes a filter housing that defines an inlet and an outlet, and a filter module disposed inside the filter housing and configured to purify water received through the inlet and supply purified water to the outlet. The filter module includes a carbon block that includes a mixture of activated carbon, a binder, iron hydroxide, and titanium oxide. A weight of the activated carbon in the mixture is greater than a weight of each of the binder, the iron hydroxide, and the titanium oxide in the mixture; the weight of the titanium oxide in the mixture is greater than the weight of the iron hydroxide in the mixture; and the weight of the binder in the mixture is less that the weight of each of the iron hydroxide and the titanium oxide in the mixture. In some implementations according to this aspect, a water purifier may include at least one water purifier filter configured to produce purified water from raw water, and the at least one water purifier filter may include the filter described above.

According to another aspect, a filter for a water purifier includes a filter housing that defines an inlet and an outlet, and a filter module disposed inside the filter housing and configured to purify water received through the inlet and supply purified water to the outlet. The filter module may include a carbon block that includes a mixture of activated carbon, a binder, iron hydroxide, and titanium oxide, where a weight of the binder in the mixture is 5 to 15% of a total weight of the mixture. In some implementations according to this aspect, a water purifier may include at least one water purifier filter configured to produce purified water from raw water, and the at least one water purifier filter may include the filter described above.

According to another aspect, a filter for a water purifier includes a filter housing that defines an inlet and an outlet, and a filter module disposed inside the filter housing and configured to purify water received through the inlet and supply purified water to the outlet. The filter module includes a carbon block that includes a mixture of activated carbon, a binder, iron hydroxide, and titanium oxide, where a weight of the binder in the mixture is 90 to 110% of a weight of the iron hydroxide in the mixture. In some implementations according to this aspect, a water purifier may include at least one water purifier filter configured to produce purified water from raw water, and the at least one water purifier filter may include the filter described above.

In some implementations, the binder may be uniformly dispersed as the particle size of the binder becomes small and the binder content is reduced. As a result, the specific surface area of the heavy metal removing material may be increased, thereby improving the heavy metal removing performance.

In some implementations, the purified water flow rate may be increased and the effective purified water amount may be increased.

In some implementations, the heavy metals in the water, including the chromium (Cr), the selenium (Se), the manganese (Mn), and the zinc (Zn), may be removed reliably.

In some implementations, the heavy metals such as the lead, the mercury, the arsenic, the iron, the aluminum, the copper, the cadmium, and the like in the water may be removed while securing a treatment capacity.

In some implementations, at least nine kinds of the heavy metals may be removed.

In some implementations, the water purification takes place several times by the plurality of filters. Thus, the removal of various foreign substances including the heavy metals may proceed more reliably.

In some implementations, since only the material of the filter is changed and the shape or arrangement of the filter applied to the water purifier is not changed, the filter of the present disclosure may be directly applied to the existing water purifier.

In some implementations, the heterogeneous filter may be longitudinally disposed in the single filter housing to reduce the volume of the filter. Thus, the space utilization may be improved and further the water purifier may be implemented slimly.

BRIEF DESCRIPTION OF THE DRAWINGS

FIG. 7 is a table comparing specifications of the carbon block applied to the filter according to the present disclosure and the carbon block with each other in related art.

FIG. 8 is a table showing an example of a composition ratio of the carbon block applied to the filter.

FIG. 9 is a table showing examples of heavy metal removal test results based on mixing ratios of other materials in the activated carbon.

FIG. 10 is a table showing examples of particle sizes of materials of the carbon block applied to the filter.

DETAILED DESCRIPTION

Figure 1:
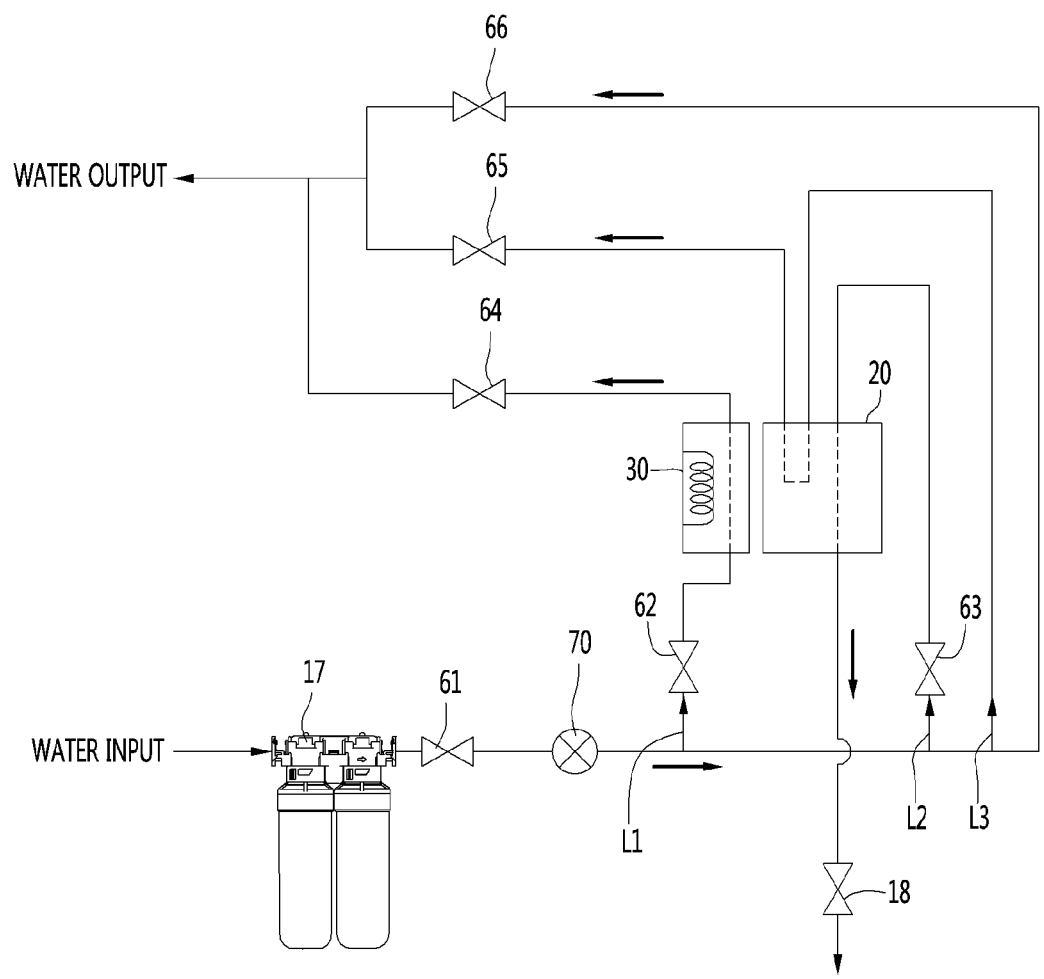
FIG. 1 is a water pipe diagram showing an example of a water purifier.

Hereinafter, one or more implementations of the present disclosure will be described in detail with reference to the drawings. However, the spirit of the present disclosure is not limited to the implementations to be presented below. Those skilled in the art who understand the spirit of the present disclosure may readily implement other implementations that fall within the scope of the same idea by adding, modifying, deleting, and adding components, but it will also be within the scope of the present disclosure.

The drawings attached to following implementations may belong to the same or similar implementations, but in order to be easily understood within the scope that the disclosure is not impaired, fine parts thereof may be represented differently for each drawing. Certain parts may not be represented or may be exaggeratedly represented depending on the drawing.

FIG. 1 is an example of a water pipe diagram of a water purifier.

In some implementations, the water purifier may be configured to purify water supplied directly from an external water source, then cool or heat the purified water, and then discharge the cooled or heated water. For example, the water purifier may be a direct-type cold and warmth water purifier.

In some examples, the direct-type water purifier may refer to a water purifier in which purified water is extracted in a user's purified water extraction operation without a reservoir for storing the purified water therein.

In some cases, the water purifier may be formed integrally with a refrigerator.

In some cases, the water purifier may be an under-sink water purifier in which a body is installed at a lower portion of a sink and a water discharge hole is installed outside the sink.

Referring to FIG. 1, in the water purifier, a water supply line L is formed from a water supply source to the water discharge hole of the water purifier, and various valves and water purification parts may be connected to the water supply line L.

In more detail, the water supply line L may be connected to the water supply source, such as a faucet in home or the like. Further, a filter assembly 17 is disposed at an arbitrary point of the water supply line L to filter foreign substances contained in drinking water supplied from the water supply source.

In some examples, a water supply valve 61 and a flow rate sensor 70 may be sequentially arranged on the water supply line L connected to an outlet end of the water supply line 17. Therefore, when a supply amount detected by the flow rate sensor 70 reaches a set flow rate, the water supply valve 61 may be controlled to close.

In some implementations, a water supply line L1 for supplying hot water, a water supply line L3 for supplying cold water, and a water supply line L2 for supplying cooling water may be branched at an arbitrary point of the water supply line L extending from an outlet end of the flow rate sensor 70.

In some implementations, a purified water discharge valve 66 may be mounted at an end of the water supply line L extending from the outlet end of the flow rate sensor 70. Further, a hot water discharge valve 64 may be mounted at an end of the water supply line L1 for supplying the hot water. Further, a cold water discharge valve 65 may be mounted at an end of the water supply line L3 for supplying the cold water. Further, a cooling water valve 63 may be mounted at an arbitrary point of the water supply line L2 for supplying the cooling water. The cooling water valve 63 adjusts an amount of cooling water supplied to a cold water generating unit 20.

In some implementations, all of water supply lines respectively extending from outlet ends of the hot water discharge valve 64, the cold water discharge valve 65, and the purified water discharge valve 66 are connected to the water discharge hole. Further, as shown, the purified water, cold water, and hot water may be connected to a single discharge hole, or may be connected to independent discharge holes, respectively, in some cases.

Hereinafter, cold water and hot water supply processes will be described.

First, in the case of the cold water, when the cooling water valve 63 is opened and the cooling water is supplied to the cold water generating unit 20, cold water is generated as the water in the water supply line L3 for supplying the cold water passing through the cold water generating unit 20 is cooled by the cooling water.

In some implementations, the water supply line L2 for supplying the cooling water may be provided with a refrigerant cycle for cooling the cooling water. The refrigerant cycle may include a compressor, a condenser, an expansion valve, an evaporator, and the like.

Thereafter, when the cold water discharge valve 65 is opened by pressing a cold water selection button of an operation display, the cold water may be discharged through the water discharge hole.

Further, in the case of the hot water, when hot water is generated as water flowing along the water supply line L1 for supplying the hot water is heated by a hot water heater 30, and the hot water discharge valve 64 is opened by pressing a hot water selection button of the operation display, the hot water may be discharged through the water discharge hole.

The water purifier having the above-described configuration includes at least one water purifier filter to generate purified water from raw water. The water purifier filter will be described below.

Hereinafter, a filter for a water purifier will be described.

Figure 2:
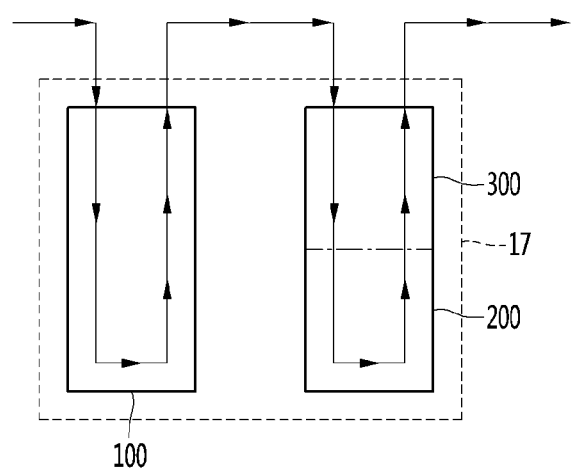
FIG. 2 is a conceptual diagram showing an example of a filter assembly.
Figure 3:
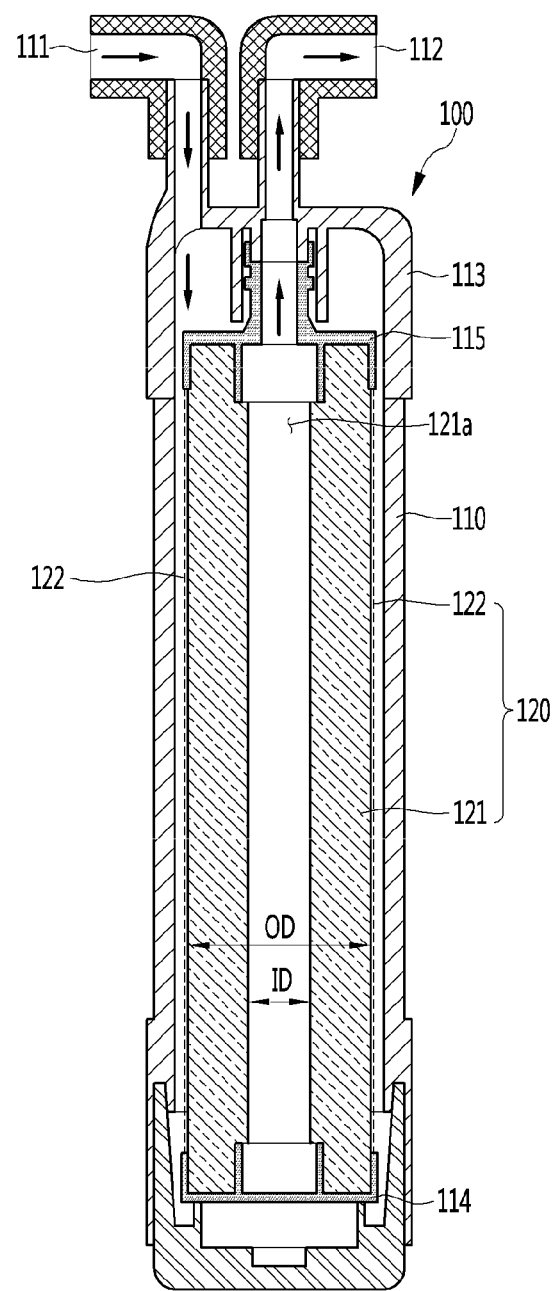
FIG. 3 is a cross-sectional view showing an example of a pre carbon filter.
Figure 4:
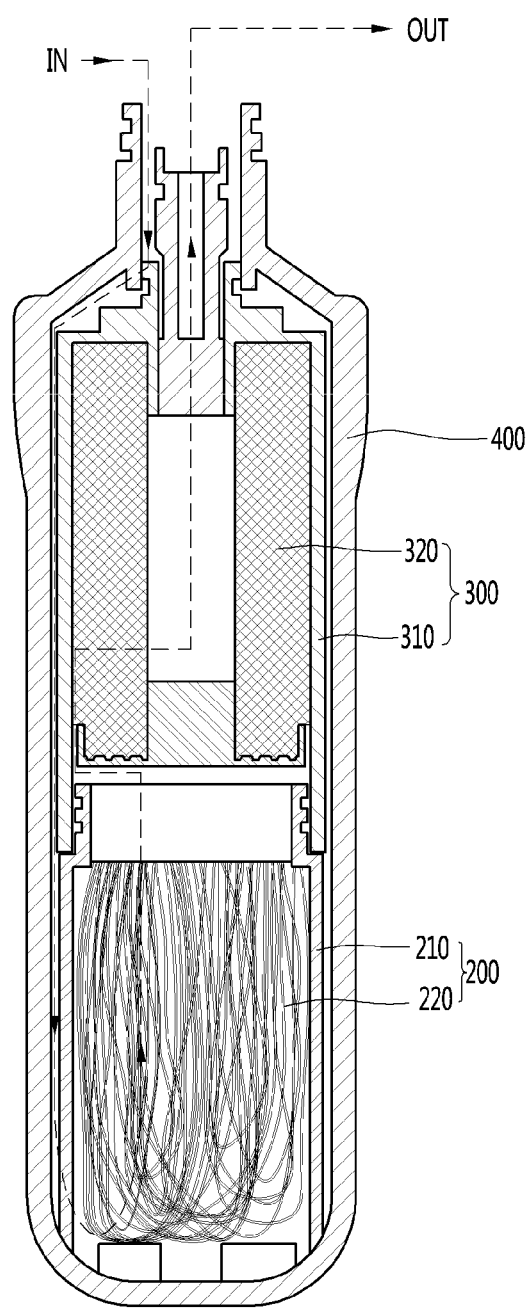
FIG. 4 is a cross-sectional view showing an example of a composite filter.

FIG. 2 is a conceptual diagram showing an example of a filter assembly. FIG. 3 is a cross-sectional view showing an example of a pre carbon filter. FIG. 4 is a cross-sectional view showing an example of a composite filter.

Referring to FIGS. 2 to 4, a filter for a water purifier (hereinafter, referred to as a filter assembly) may include at least one of a pre carbon filter 100 having a carbon block 121 in a hollow tube form embedded therein, a hollow fiber membrane filter 200 having a plurality of hollow fiber membranes 220 embedded therein, or a post carbon filter 300 having a second carbon block 320 in a hollow tube form embedded therein.

As an example, the filter assembly 17 may include all of the pre carbon filter 100, the hollow fiber membrane filter 200, and the post carbon filter 300.

In some implementations, the pre carbon filter 100 may include a filter housing 110 and a filter module 120.

The filter housing 110 may define an inlet 111 and an outlet 112. That is, water requiring purification flows through the inlet 111 and purified water is discharged through the outlet 112. Thus, the water is purified by the filter module 120 disposed between the inlet 111 and the outlet 112 while flowing between the inlet 111 and the outlet 112.

In some implementations, the filter housing 110 may define a space for accommodating the filter module 120 therein, and may include an upper cap 113 having the inlet 111 and the outlet 112 formed thereon. In this connection, the space of the filter housing 110 may be in communication with outside through the inlet 111 and the outlet 112 of the upper cap 113.

When the upper cap 113 is provided as described above, the filter module 120 may be easily mounted in the space of the filter housing 110 by opening the upper cap 113 and the filter module 120 accommodated in the filter housing 110 may be easily replaced.

The water flowed into the filter housing 110 through the inlet 111 may be purified while passing through the filter module 120. That is, foreign substances (e.g., heavy metals) contained in raw water such as tap water or the like may be removed while passing through the filter module 120. In other words, the raw water may be unfiltered water that may be provided from one or more water sources outside the filter module 120 and that may include foreign substances, scent, chemicals, etc.

In some implementations, a filter for a water purifier and a water purifier including the same having an excellent effect of removing the heavy metals in the water may be provided.

In some examples, the filter module 120 may include a carbon block 121 produced by mixing the activated carbon, the binder, iron hydroxide, and titanium oxide with each other to form a mixture and forming the mixture in a hollow block shape.

As an example, the carbon block 121 may be produced by mixing 40 to 50% by weight of the activated carbon, 5 to 15% by weight of the binder, 10 to 20% by weight of the iron hydroxide, and 30 to 40% by weight of the titanium oxide with each other. That is, the carbon block 121 may include a mixture of: activated carbon having a weight corresponding to 40 to 50% of a weight of the mixture; a binder having a weight corresponding to 5 to 15% of the weight of the mixture; iron hydroxide having a weight corresponding to 10 to 20% of the weight of the mixture; and titanium oxide having a weight corresponding to 30 to 40% of the weight of the mixture.

The titanium oxide may be provided as titanium dioxide or titanium tetraoxide.

In some implementations, the titanium oxide may include a functional group in which a plurality of oxygen (O) is covalently bonded to one titanium (Ti).

For example, sodium orthotitanate ($Na_4TiO_4$), which is a kind of the titanium oxide, may remove heavy metals in water through a chemical reaction formula as in a following Formula (1).

$$Na_4TiO_4 + 2Me^{++} \rightarrow Me_2TiO_4 + 4Na^+ \qquad (1)$$

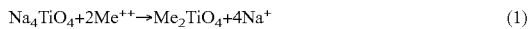

In the formula (1), 'Me' refers to a heavy metal, and the heavy metal is dissolved in water in a form of a water-soluble compound.

Through the chemical reaction between the water-soluble heavy metal compound and the sodium orthotitanate ($Na_4TiO_4$) as described above, purified water from which the heavy metal Me is removed is discharged out of the filter housing 110 through the outlet 112.

In some examples, the 'Me' may correspond to cadmium (Cd).

In this case, the sodium orthotitanate ($Na_4TiO_4$) may remove cadmium (Cd) in water through a chemical reaction formula as in a following formula (2).

$$Na_4TiO_4 + 2Cd^{++} \rightarrow Cd_2TiO_4 + 4Na^+ \qquad (2)$$

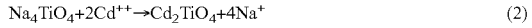

In some examples, the titanium oxide may be in a form or a granule or powder, and may be mixed with materials of the carbon block 121 to form the carbon block 121.

Therefore, when the water containing the heavy metal passes through the filter module 120, the heavy metal in the water may be removed.

In some examples, the carbon block 121 may contain iron hydroxide (Ferric Hydroxide).

In some implementations, the iron hydroxide (Ferric Hydroxide) may be a synthetic iron hydroxide (α-FeOOH) compound.

The synthetic iron hydroxide (α-FeOOH) compound may include a functional group as in a following formula (3).

In other words, the synthetic iron hydroxide (α-FeOOH) compound may include a functional group in which a plurality of iron (Fe) are respectively ionically bonded with hydroxyl groups (—OH) and each iron (Fe) is ionically or covalently bonded to one oxygen (O).

As an example of such a synthetic iron hydroxide (α-FeOOH) compound, a trade name 'Bayoxide E33HCF' provided by LanXess may be used.

The synthetic iron hydroxide (α-FeOOH) compound may remove the heavy metals in the water through a chemical reaction as in a following formula (4).

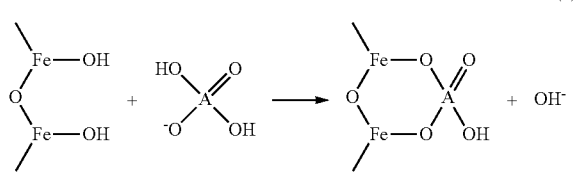

(4)

In the chemical formula, 'A' refers to the heavy metal, and the heavy metal may be dissolved in the water in the form of the water-soluble compound.

As described above, when the water-soluble heavy metal compound and the synthetic iron hydroxide (α-FeOOH) compound are chemically reacted with each other, water and a hydroxide ion are generated. In addition, the heavy metal (A) becomes to be in a strong ionic bond or covalent bond with the synthetic iron hydroxide (α-FeOOH) compound. Therefore, the removed heavy metal (A) may be prevented from dissolving again in the water. In addition, purified water from which the heavy metal A is removed through the filter module 120 is discharged out of the filter housing 110 through the outlet 112. For example, the heavy metal (A) may be 'arsenic'.

In some implementations, the iron hydroxide may remove cadmium (Cd) in the water through a chemical reaction formula as in a following formula (5).

$$2Fe^{2+}+Cd^{2+}+4OH^-\rightarrow CdFe_2O_4+2H_2 \quad (5)$$

In some examples, the synthetic iron hydroxide (α-FeOOH) compound may be in the form or a granule or powder, and may be mixed with the materials of the carbon block 121 together with the binder to form the carbon block 121.

In addition, the carbon block 121 may further include activated carbon.

The activated carbon may be included in the form of granule or powder. As described above, when the carbon block 121 includes the activated carbon, the carbon block 121 may effectively remove residual chlorine in the water while removing the heavy metals in the water. Accordingly, taste of the water may also be improved.

In addition, chloroform ($CHCl_3$) in the water may also be effectively removed by the activated carbon.

The binder is mixed to connect the activated carbon, the titanium oxide (e.g., $Na_4TiO_4$). and the iron hydroxide (Ferric Hydroxide) with each other and to provide rigidity.

With the configuration of the binder, the activated carbon, the titanium oxide (e.g., $Na_4TiO_4$), and the iron hydroxide (Ferric Hydroxide) may be processed into a block form having rigidity.

In one example, the filter module 120 may be formed by mixing the above-mentioned materials with each other uniformly to form a mixture, then putting the mixture in a mold, and heating the mixture. The binder (e.g., polyethylene, PE) is melted in the mold by the heating, so that the activated carbon, the titanium oxide (e.g., $Na_4TiO_4$), and the iron hydroxide (Ferric Hydroxide) are combined with each other. Thus, the block-shaped carbon block 121 having overall rigidity may be formed.

In one example, in general, the water purifier is already equipped with several filters to remove the heavy metals and various foreign substances in the water. When the several filters are installed, the water purification performance may be ensured, but the flow rate of the purified water is inevitably reduced.

In addition, the existing water purifier has a limited space defined therein to install the filter, so that it is not easy to add a new filter. Further, each filter (e.g., activated carbon filter) installed in the water purifier basically has an individual function to improve the water purification performance. Therefore, it is not desirable to omit the existing filter for the addition of the new filter.

However, according to the present disclosure, the carbon block 121 may be formed by mixing the activated carbon, the titanium oxide, and the iron hydroxide with each other.

Therefore, the heavy metals in the water may be removed without increasing the number of filters while maintaining original functions and effects of the activated carbon filter installed in the conventional water purifier. In addition, since the number of filters is not increased, a decrease in the flow rate of the purified water may be prevented.

Hereinafter, a mixing ratio and a particle size of each material constituting the carbon block will be described.

In some implementations, the carbon block 121 may be produced by mixing 40 to 50% by weight of the activated carbon, 5 to 15% by weight of the binder, 10 to 20% by weight of the iron hydroxide, and 30 to 40% by weight of the titanium oxide.

As an example, the carbon block 121 may have a weight of 115 to 135 g, and may be produced by mixing the activated carbon of 50 to 60 g, the binder of 10 to 20 g, the iron hydroxide of 15 to 20 g, and the titanium oxide of 30 to 40 g with each other.

As another example, the carbon block 121 may be produced by mixing the activated carbon of 54 g, the binder of 13 g, the iron hydroxide of 18 g, and the titanium oxide of 40 g with each other.

In some examples, when the ratio of the titanium oxide and the iron hydroxide becomes greater than the above ratio, a heavy metal removal performance is increased, but the purified water flow rate may be reduced. In some examples, when the ratio of the titanium oxide and the iron hydroxide becomes smaller than the above ratio, the purified water flow rate is increased, but the heavy metal removal performance may be reduced.

In some implementations, the mixing ratio of the titanium oxide and the iron hydroxide may be variously adjusted based on types and ratios of the heavy metals contained in the water to be purified.

In addition, when the ratio of the activated carbon becomes greater than the above ratio, it is difficult to ensure the heavy metal removal performance. Further, when the ratio of the activated carbon becomes smaller than the above-described ratio it is difficult to remove chloroform and chlorine in the water.

The binder used essentially to form the carbon block is a key material for binding the materials with each other to form a block.

However, a specific surface area of the material bound by the binder may vary depending on content of the binder, which may affect the removal performance of the carbon block and the purified water flow rate.

An existing binder of a large particle size (120 μm) must be contained in content of 30 to 40% of total content of the carbon block to form the block, which acted as one of main factors to reduce the specific surface area of the material.

However, in the present disclosure, a binder of a small particle size is applied instead of the existing binder of the large particle size (120 μm), so that the binder is uniformly dispersed to increase the specific surface area of the material while reducing the total content of the binder to 5 to 15% of the total content of the carbon block, thereby improving a material adsorption performance. Further, activated carbon content relative to the same density is increased to improve purified water flow rate and effective purified water amount performances.

According to the present disclosure as described above, as the raw water flowed into the filter housing 110 passes through the carbon block 121, the heavy metals may be removed and the water may be purified.

In addition, the filter module 120 may further include an anion exchange resin non-woven fabric 122 for surrounding an outer face of the carbon block 121.

When the anion exchange resin non-woven fabric 122 is provided on the outer face of the carbon block 121 as described above, the raw water flowed into the pre carbon filter 100 passes through the anion exchange resin non-woven fabric 122 and then passes through the carbon block 121.

When the raw water passes through the anion exchange resin non-woven fabric 122 as described above, the heavy metals such as chromium (Cr) and selenium (Se) may be removed.

In this connection, the anion exchange resin non-woven fabric 122 may be provided in multiple layers to improve the heavy metal removal efficiency.

As described above, the raw water flowed into the pre carbon filter 100 passes through the anion exchange resin non-woven fabric 122 and the carbon block 121, then passes through a hollow 121a of the carbon block 121, and then is discharged out of the pre carbon filter 100.

Further, the filter assembly 17 may include the hollow fiber membrane filter 200 having the plurality of hollow fiber membranes 220 embedded therein and the post carbon filter 300 having the second Further, when the hollow fiber membrane filter 200 and the post carbon filter 300 are additionally provided as described above, as the water flowed into the filter assembly 17 passes through the pre carbon filter 100, the hollow fiber membrane filter 200, and the post carbon filter 300, the water purification takes place several times. Thus, the removal of various foreign substances including the heavy metals proceeds more reliably.

In particular, the chlorine component and the chloroform ($CHCl_3$) in the water may be more reliably removed by the post carbon filter 300 further provided.

In some implementations, the hollow fiber membrane filter 200 and the post carbon filter 300 may be accommodated in one filter housing 400 to constitute the composite filter. In this connection, the hollow fiber membrane filter 200 and the post carbon filter 300 may be arranged in a line such that the water passed through the hollow fiber membrane filter 200 passes through the post carbon filter 300.

In detail, the hollow fiber membrane filter 200 includes a first auxiliary filter housing 210 and the hollow fiber membrane 220. Further, the post carbon filter 300 includes a second auxiliary filter housing 310 and the second carbon block 320. Further, the auxiliary filter housings 210 and 310 are accommodated inside the filter housing 400.

As described above, when the hollow fiber membrane filter 200 and the post carbon filter 300 are arranged in a line in one filter housing 400, a purified water flow rate may be maintained while increasing a filtration efficiency.

In addition, without a need to expand a filter installation space defined in the water purifier, the present disclosure may be applied immediately by simply replacing the existing filter.

In addition, a space utilization may be increased by reducing a volume of the filter and further the water purifier may be implemented slimly.

As described above, the raw water flowed into the water purifier is purified, while passing through the pre carbon filter 100 and the composite filter 200 and 300.

In detail, the raw water flowed into the pre carbon filter 100 is firstly filtered while passing through the anion exchange resin non-woven fabric 122 and is secondarily filtered while passing through the carbon block 121 in which the activated carbon, the binder, the iron hydroxide, and the titanium oxide are mixed with each other. Then, the water is discharged out of the pre carbon filter 100.

The water discharged from the pre carbon filter 100 as described above is flowed into the composite filter 200 and 300.

The raw water flowed into the composite filter 200 and 300 is flowed into the hollow fiber membrane filter 200 and then is thirdly filtered while passing through the hollow fiber membrane 220. Thereafter, the water discharged from the hollow fiber membrane filter 200 flows into the post carbon filter 300, is fourthly filtered while passing through the carbon filter 300, and then is discharged out of the post carbon filter 300.

Therefore, the raw water flowed into the filter assembly 17 may be purified into a state of purified water from which the heavy metals and foreign substances are removed while going through the plurality of filtration processes as described above.

In some implementations, when the water passes through the carbon block 121 in which the activated carbon, the binder, the iron hydroxide, the titanium oxide are mixed with each other as described above, nine kinds of heavy metals, that is, mercury, lead, copper, aluminum, iron, cadmium, arsenic, manganese, and zinc may be removed therefrom.

In detail, the mercury, the lead, the iron, the aluminum, the cadmium, the arsenic, and the copper may be removed by the iron hydroxide in the carbon block 121. Further, the manganese and the zinc may be removed by the titanium oxide in the carbon block 121.

In some implementations, the manganese and the zinc contained in the water may be ion-adsorbed to the titanium dioxide ($TiO_2$) through a chemical reaction as in a following formula (6) and may be removed from the water.

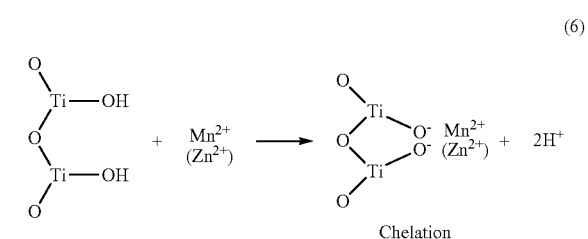

(6)

Chelation

Further, the chromium contained in the water may be ion-adsorbed to the iron hydroxide (α-FeOOH) through a chemical reaction as in a following formula (7) and may be removed from the water.

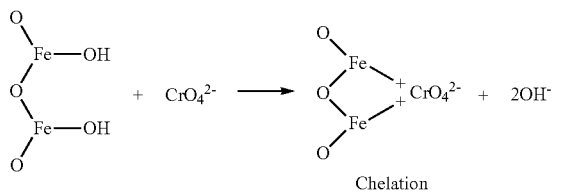

(7)

Chelation

Further, the selenium may be ion-adsorbed to the titanium dioxide ($TiO_2$) through a chemical reaction as in a following formula (8) and may be removed from the water.

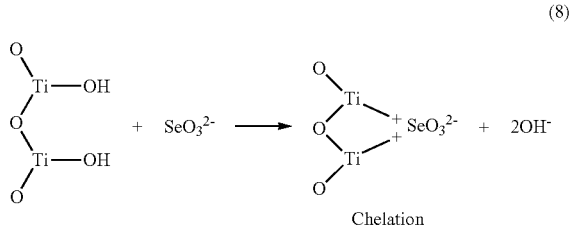

(8)

Chelation

In addition, in the present disclosure, the binder with the small particle size, which is about one quarter in size compared to the conventional binder, is mixed. In addition, a mixed amount of the binder is reduced to about ½ compared to that of the conventional binder, so that the binder of only about 10% is mixed. Further, a mixing ratio of the activated carbon may be increased to lower a density of the entire filter and improve a treatment flow rate. In addition, based on the same volume, as the activated carbon ratio is increased, the heavy metal removal rate is improved.

In detail, in order to improve functions of the activated carbon and a heavy metal removal material of the carbon block 121, the binder with the small particle size may be applied in production of the carbon block 121, thereby increasing the specific surface area of the material while uniformly mixing the materials with each other even using a small amount of the binder. Therefore, the heavy metal removal performance, the effective purified water amount performance, and the purified water flow rate may be increased.

FIGS. 5A to 6B are views comparing examples of surfaces of carbon blocks based on particle sizes of binders with each other.

Figure 5A:
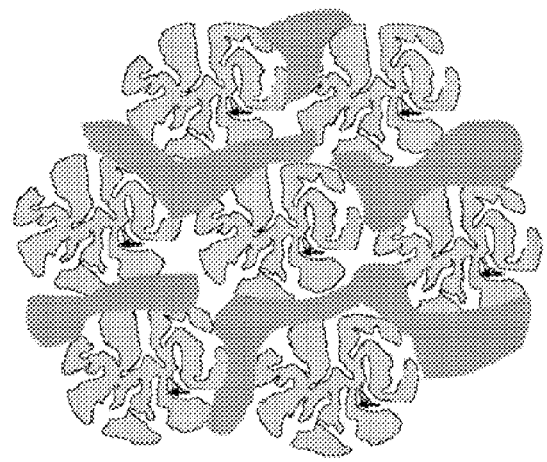
FIGS. 5A to 5B are views comparing examples of surfaces of carbon blocks
Figure 5B:
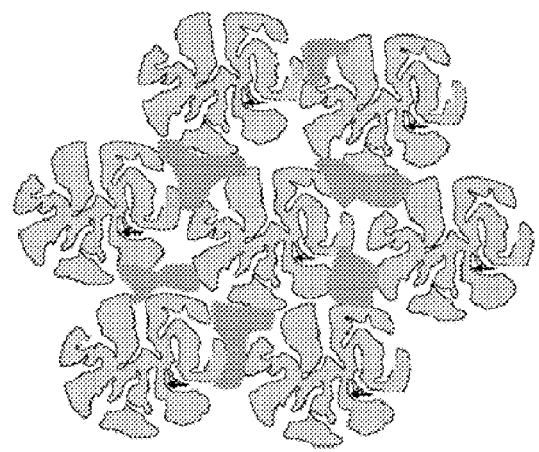
Figure 6A:
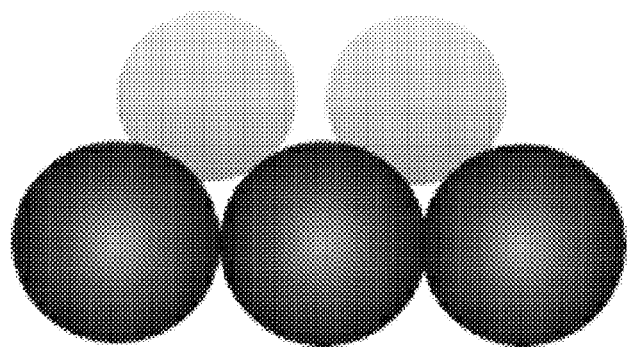
FIGS. 6A to 6B are views comparing examples of particle sizes of binders.
Figure 6B:
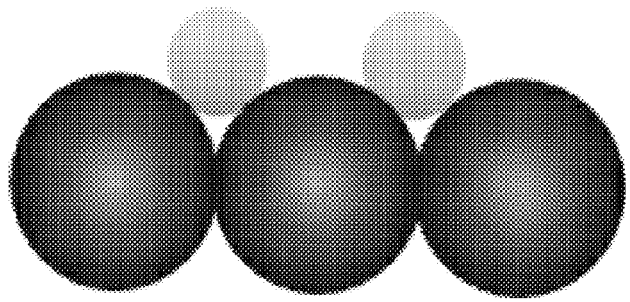

FIG. 5A and FIG. 6A are views analyzing a surface of a carbon block when a binder particle size is 120 μm. FIG. 5B and FIG. 6B are views analyzing a surface of a carbon block when a binder particle size is smaller than 120 μm.

Referring to FIGS. 5A to 6B, when the particle size of the binder is smaller than 120 μm, as the binder is uniformly dispersed, the activated carbon, the iron hydroxide, and the titanium oxide may be bound with each other even only using a small amount of the binder. Thus, the mixed amount of the binder may be lowered.

Further, as the binder mixed amount is lowered, the mixed amounts of the activated carbon, the iron hydroxide, and the titanium oxide are increased. Thus, the specific surface area of the material may be increased, and as a result, the heavy metal removal performance may be improved. Further, as the ratio of the binder decreased, the water permeability and the effective purified water amount may increase.

FIG. 7 is a table comparing an example of specifications of the carbon block applied to the filter with a carbon block in related art. FIG. 8 is a table showing an example of a composition ratio of the carbon block applied to the filter according to the present disclosure. FIG. 9 is a table comparing an example of heavy metal removal test results based on mixing ratios of other materials in the activated carbon. FIG. 10 is a table summarizing example particle sizes of materials of the carbon block applied to the filter according to the present disclosure.

Referring to FIGS. 7 to 10, an inner diameter ID (see FIG. 3) and an outer diameter OD (see FIG. 3) of the carbon block 121 may have a ratio of 1:3 to 1:4.

That is, the carbon block 121 may be thicker than that of the prior art.

In addition, the binder may be provided as polyethylene (PE) and may be formed with a low particle size.

In addition, a particle size of the iron hydroxide may be smaller than a particle size of the activated carbon, a particle size of the titanium oxide may be smaller than the particle size of the iron hydroxide, and a particle size of the binder may be smaller than the particle size of the titanium oxide.

As an example, the iron hydroxide may have a particle size of about 60 to 120 μm. Further, an average particle size of the iron hydroxide may be about 90 μm.

In addition, the titanium oxide may have a particle size of about 30 to 80 μm. Further, an average particle size of the titanium oxide may be about 50 μm.

In addition, the activated carbon may have a particle size of about 100 to 140 μm. Further, an average particle size of the activated carbon may be about 120 μm.

In some implementations, the filter module may include the carbon block produced by mixing the activated carbon, the binder, the iron hydroxide, and the titanium oxide with each other, wherein a mixed weight of the iron hydroxide and the titanium oxide may be included in a range of 100 to 110% of a mixed weight of the activated carbon.

In some implementations, the filter module may include the carbon block produced by mixing the activated carbon, the binder, the iron hydroxide, and the titanium oxide with each other, wherein a mixed weight of the activated carbon may be the largest, a mixed weight of the titanium oxide may be greater than a mixed weight of the iron hydroxide, and a mixed weight of the binder may be the smallest.

In some implementations, the filter module may include the carbon block produced by mixing the activated carbon, the binder, the iron hydroxide, and the titanium oxide with each other, wherein the binder may be mixed in a range of 5 to 15% by weight of a total weight of the carbon block.

In some implementations, the filter module may include the carbon block produced by mixing the activated carbon, the binder, the iron hydroxide, and the titanium oxide with each other, wherein a mixed weight of the binder may be included in a range of 90 to 110% of a mixed weight of the iron hydroxide.

Referring to FIG. 9, when the mixing ratio of the binder relative to the activated carbon becomes small, removal rates of the arsenic, the manganese, and the zinc may be increased.

Figure 11:
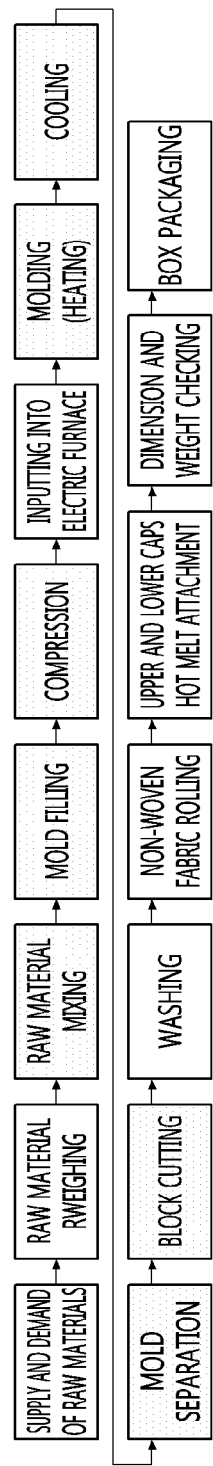
FIG. 11 is a block diagram illustrating an example of a production process of a carbon block applied to a filter.

FIG. 11 is a block diagram illustrating an example of a production process of a carbon block applied to a filter according to the present disclosure.

Referring to FIG. 11, first, the materials constituting the carbon block 121 are mixed with each other in proportion to generate a carbon block mixture.

For example, the carbon block mixture may be produced by mixing the activated carbon of 54 g, the binder of 13 g, the iron hydroxide of 18 g, and the titanium oxide of 40 g with each other. In addition, the binder may have a particle size smaller than that of the titanium oxide.

Then, the evenly mixed carbon block mixture is filled in the mold. After the compression process, the carbon block mixture is put into an electric furnace.

Then, the carbon block mixture is heated. In the heating process, the binder, for example, the polyethylene (PE) may be melted, so that the activated carbon, the iron hydroxide, the titanium oxide, and the binder are integrally bonded with each other. Then, the carbon block 121 having the hollow tube shape with the overall rigidity may be molded.

After the heating, the carbon block is cooled. Then, when the cooling ends, the mold is separated from the carbon block.

In addition, the carbon block in the form of the hollow tube separated from the mold may be cut to a unit length.

In addition, the carbon block, which had been cut, is washed through compressed air injection.

Thereafter, the non-woven fabric surrounds the carbon block and then upper and lower caps are attached thereto in a hot melt scheme.

Thereafter, a dimension, a weight, and the like of the carbon block are checked. When there is no abnormality, a packaging of the carbon block is performed.

According to the present disclosure as described above, the binder with the small particle size compared to the conventional binder may be applied to lower the mixing ratio of the binder by about half.

Further, the binder may be uniformly dispersed as the particle size of the binder becomes small and the binder content is reduced. As a result, the specific surface area of the heavy metal removing material is increased, thereby improving the heavy metal removing performance.

Further, the binder may be uniformly dispersed as the particle size of the binder becomes small and the binder content is reduced. As a result, the purified water flow rate is increased and the effective purified water amount is increased.

In addition, the heavy metals in the water, including the manganese (Mn) and the zinc (Zn), may be removed reliably.

According to the present disclosure, the heavy metals such as the lead, the mercury, the arsenic, the iron, the aluminum, the copper, and the like in the water may be removed reliably while securing a treatment capacity.

What is claimed is:

1. A filter for a water purifier, the filter comprising:
a filter housing that defines an inlet and an outlet; and
a filter module disposed inside the filter housing and configured to purify water received through the inlet and supply purified water to the outlet, the filter module comprising a carbon block that comprises a mixture of:
activated carbon having a weight corresponding to 40 to 50% of a weight of the mixture,
a binder having a weight corresponding to 5 to 15% of the weight of the mixture,
iron hydroxide having a weight corresponding to 10 to 20% of the weight of the mixture, and
titanium oxide having a weight corresponding to 30 to 40% of the weight of the mixture,
wherein an average particle size of the binder is less than an average particle size of each of the activated carbon, the iron hydroxide, and the titanium oxide.

2. The filter of claim 1, wherein the binder comprises polyethylene (PE).

3. The filter of claim 2, wherein the carbon block has a hollow tube shape.

4. The filter of claim 3, further comprising a non-woven fabric that is made of a resin and that covers an outer surface of the carbon block.

5. The filter of claim 3, wherein a ratio of an inner diameter of the carbon block to an outer diameter of the carbon block is 1:3 to 1:4.

6. The filter of claim 1, wherein the titanium oxide comprises titanium dioxide.

7. A filter for a water purifier, the filter comprising:
a filter housing that defines an inlet and an outlet; and
a filter module disposed inside the filter housing and configured to purify water received through the inlet and supply purified water to the outlet, the filter module comprising a carbon block that comprises a mixture of activated carbon, a binder, iron hydroxide, and titanium oxide,
wherein the binder comprises polyethylene (PE), and
wherein an average particle size of the binder is less than an average particle size of each of the activated carbon, the iron hydroxide, and the titanium oxide.

8. The filter of claim 7, wherein the average particle size of the iron hydroxide is less than the average particle size of the activated carbon, and
wherein the average particle size of the titanium oxide is less than the average particle size of the iron hydroxide.

9. The filter of claim 8, wherein the average particle size of the activated carbon is less than or equal to 120 µm,
wherein the average particle size of the iron hydroxide is less than or equal to 90 µm, and
wherein the average particle size of the titanium oxide is less than or equal to 50 µm.

10. A filter for a water purifier, the filter comprising:
a filter housing that defines an inlet and an outlet; and
a filter module disposed inside the filter housing and configured to purify water received through the inlet and supply purified water to the outlet, the filter module comprising a carbon block that comprises a mixture of activated carbon, a binder, iron hydroxide, and titanium oxide,
wherein a combined weight of the iron hydroxide and the titanium oxide in the mixture is 100 to 110% of a weight of the activated carbon in the mixture.

11. A filter for a water purifier, the filter comprising:
a filter housing that defines an inlet and an outlet; and
a filter module disposed inside the filter housing and configured to purify water received through the inlet and supply purified water to the outlet, the filter module comprising a carbon block that comprises a mixture of activated carbon, a binder, iron hydroxide, and titanium oxide, and
wherein a weight of the activated carbon in the mixture is greater than a weight of each of the binder, the iron hydroxide, and the titanium oxide in the mixture,
wherein the weight of the titanium oxide in the mixture is greater than the weight of the iron hydroxide in the mixture, and
wherein the weight of the binder in the mixture is less that the weight of each of the iron hydroxide and the titanium oxide in the mixture.

12. A filter for a water purifier, the filter comprising:
a filter housing that defines an inlet and an outlet; and
a filter module disposed inside the filter housing and configured to purify water received through the inlet and supply purified water to the outlet, the filter module comprising a carbon block that comprises a mixture of activated carbon, a binder, iron hydroxide, and titanium oxide, wherein a weight of the binder in the mixture is 5 to 15% of a total weight of the mixture, and wherein an average particle size of the binder is less than an average particle size of each of the activated carbon, the iron hydroxide, and the titanium oxide.

13. A filter for a water purifier, the filter comprising:

a filter housing that defines an inlet and an outlet; and a filter module disposed inside the filter housing and configured to purify water received through the inlet and supply purified water to the outlet, the filter module comprising a carbon block that comprises a mixture of activated carbon, a binder, iron hydroxide, and titanium oxide, wherein a weight of the binder in the mixture is 90 to 110% of a weight of the iron hydroxide in the mixture.

14. A water purifier comprising at least one water purifier filter configured to produce purified water from raw water, the at least one water purifier filter comprising the filter according to claim 1.

15. A water purifier comprising at least one water purifier filter configured to produce purified water from raw water, the at least one water purifier filter comprising the filter according to claim 7.

16. A water purifier comprising at least one water purifier filter configured to produce purified water from raw water, the at least one water purifier filter comprising the filter according to claim 10.

17. A water purifier comprising at least one water purifier filter configured to produce purified water from raw water, the at least one water purifier filter comprising the filter according to claim 11.

18. A water purifier comprising at least one water purifier filter configured to produce purified water from raw water, the at least one water purifier filter comprising the filter according to claim 12.

19. A water purifier comprising at least one water purifier filter configured to produce purified water from raw water, the at least one water purifier filter comprising the filter according to claim 13.

20. The filter of claim 1, wherein the average particle size of the iron hydroxide is less than the average particle size of the activated carbon, and wherein the average particle size of the titanium oxide is less than the average particle size of the iron hydroxide.

* * * * *